(12) United States Patent
McKinlay et al.

(10) Patent No.: US 8,995,096 B2
(45) Date of Patent: Mar. 31, 2015

(54) MAGNETIC ELEMENT SIDE SHIELD WITH DIFFUSION BARRIER

(71) Applicant: Seagate Technology LLC, Cupertino, CA (US)

(72) Inventors: Shaun Eric McKinlay, Eden Prairie, MN (US); Eric Walter Singleton, Maple Plain, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/844,810

(22) Filed: Mar. 16, 2013

(65) Prior Publication Data

US 2014/0268418 A1  Sep. 18, 2014

(51) Int. Cl.
G11B 5/39 (2006.01)
G11B 5/11 (2006.01)

(52) U.S. Cl.
CPC ............... *G11B 5/112* (2013.01); *G11B 5/3912* (2013.01); *G11B 5/3932* (2013.01)
USPC ...................................... 360/319; 360/324.12

(58) Field of Classification Search
USPC .......... 360/319, 324.1, 324.11, 324.12, 324.2
See application file for complete search history.

(56) References Cited

U.S. PATENT DOCUMENTS

| | | | |
|---|---|---|---|
| 6,903,906 B2 | 6/2005 | Morinaga et al. | |
| 6,943,993 B2 | 9/2005 | Chang et al. | |
| 7,426,096 B2 | 9/2008 | Shimazawa et al. | |
| 7,446,979 B2 | 11/2008 | Jayasekara | |
| 7,599,151 B2 | 10/2009 | Hatatani et al. | |
| 7,978,431 B2 | 7/2011 | Han et al. | |
| 8,085,500 B2 | 12/2011 | Yazawa et al. | |
| 8,125,746 B2 | 2/2012 | Dimitrov et al. | |
| 8,254,059 B2 | 8/2012 | Horide et al. | |
| 2007/0030603 A1* | 2/2007 | Sato et al. | 360/324 |
| 2009/0166184 A1 | 7/2009 | Zhou et al. | |
| 2010/0053820 A1* | 3/2010 | Miyauchi et al. | 360/319 |
| 2011/0014390 A1* | 1/2011 | Zhou et al. | 427/547 |
| 2011/0279923 A1 | 11/2011 | Miyauchi et al. | |
| 2012/0250189 A1 | 10/2012 | Degawa et al. | |
| 2012/0275062 A1* | 11/2012 | Gao | 360/125.2 |
| 2014/0002930 A1* | 1/2014 | Dimitrov et al. | 360/235.4 |
| 2014/0004385 A1* | 1/2014 | Colak et al. | 428/815 |

* cited by examiner

*Primary Examiner* — Jefferson Evans
(74) *Attorney, Agent, or Firm* — Hall Estill Attorneys at Law

(57) ABSTRACT

Various embodiments may position a side shield adjacent to and separated from a stack sidewall of a magnetic stack with the side shield having a shield layer disposed between the stack sidewall and a permanent magnet. The permanent magnet can be separated from a first portion of the shield layer by a diffusion barrier that decouples the permanent magnet from the shield layer.

20 Claims, 4 Drawing Sheets

MAGNETIC ELEMENT SIDE SHIELD WITH DIFFUSION BARRIER

SUMMARY

Various embodiments are generally directed to a magnetic element configured with magnetic shields to limit the magnetic extent of the magnetic element.

In accordance with various embodiments, a side shield may be positioned adjacent to and separated from a stack sidewall of a magnetic stack with the side shield having a shield layer disposed between the stack sidewall and a permanent magnet. The permanent magnet can be separated from a first portion of the shield layer by a diffusion barrier that decouples the permanent magnet from the shield layer.

DETAILED DESCRIPTION

Heightened industry demand for decreased form factor data storage devices capable of ever-faster data transfer rates, increased data storage capacity, and greater data access reliability have stressed the magnetic function of materials. The magnetic characteristics of data access components such as data reading laminations and shields can have degraded performance when scaled to minuscule physical sizes. Such performance challenges may be exacerbated by the minimization of data bits and the data tracks on which the data bits are organized, which corresponds with a need for a magnetic element to have a more precise magnetic resolution and increased magnetic response to the reduced data bits.

The operational challenges of scaling a magnetic element down can further be associated with manufacturing difficulties in forming smaller data access components with robust magnetic characteristics. For example, defining a magnetic component on an angstrom scale can incur deposition, polishing, and annealing processes that alter the magnetic properties and operation of the magnetic component. Hence, magnetic structures with reduced form factors that can provide stable magnetic operation after formation and processing is a continued demand of the data storage industry.

Accordingly, a magnetic element may be configured with a side shield positioned adjacent to and separated from a stack sidewall of a magnetic stack with the side shield having a shield layer disposed between the stack sidewall and a permanent magnet. The permanent magnet may be separated from a first portion of the shield layer by a diffusion barrier that decouples the permanent magnet from the shield layer. The ability to tune the size, material, and position of the diffusion barrier can allow the permanent magnet to be formed with predetermined magnetic coercivity and anisotropy despite microscopic deposition techniques. Such tuned permanent magnet can also provide diverse magnetic operation for a magnetic element, like magnetic biasing, shielding, and magnetoresistive ratio.

Figure 1:
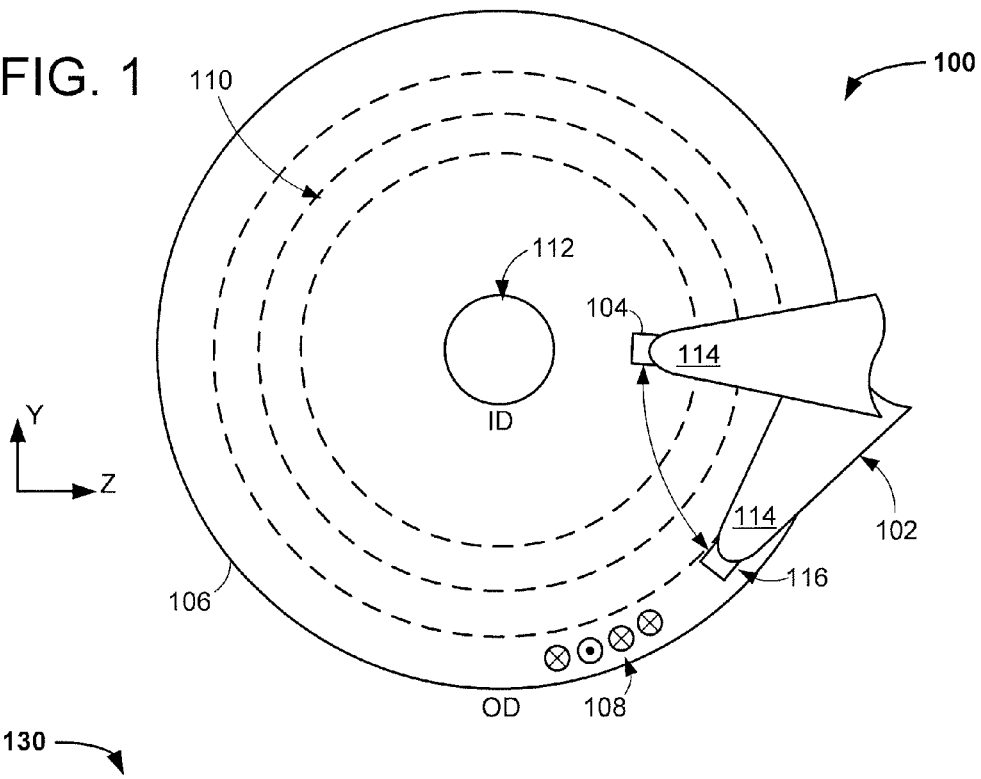
FIG. 1 is a block representation of an exemplary portion of a data storage device.

A diffusion barrier may be positioned and tuned in an unlimited variety of environments, but FIG. 1 generally illustrates a top view block representation of an example data storage device 100 environment in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks 110 configured with an areal density that determines the storage capacity of the media 106. Movement of the storage media 106 can be facilitated through attachment to one or more spindle motors 112 that rotate during use to produce an air bearing surface (ABS) on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data. As data bits 108 become more densely positioned in data tracks 110 with smaller radial widths, the head 104 may inadvertently receive magnetic flux from data bits on adjacent data tracks 110, which can induce magnetic noise and interference that degrades performance of the data storage device 100.

It should be noted that the term "stack" is an unlimited term within this disclosure that can be one or more vertically and horizontally aligned layers, constructed of magnetic and non-magnetic material that are capable of magnetic reading and writing. Throughout the present application, the term "stack" will be understood to mean a component that is constructed to respond to external data bits to provide access to external data bits in any operational environment. For example, but not in any way limiting, a magnetic stack may be a data read or write configuration that can differentiate between a plurality of data bits.

Figure 2:
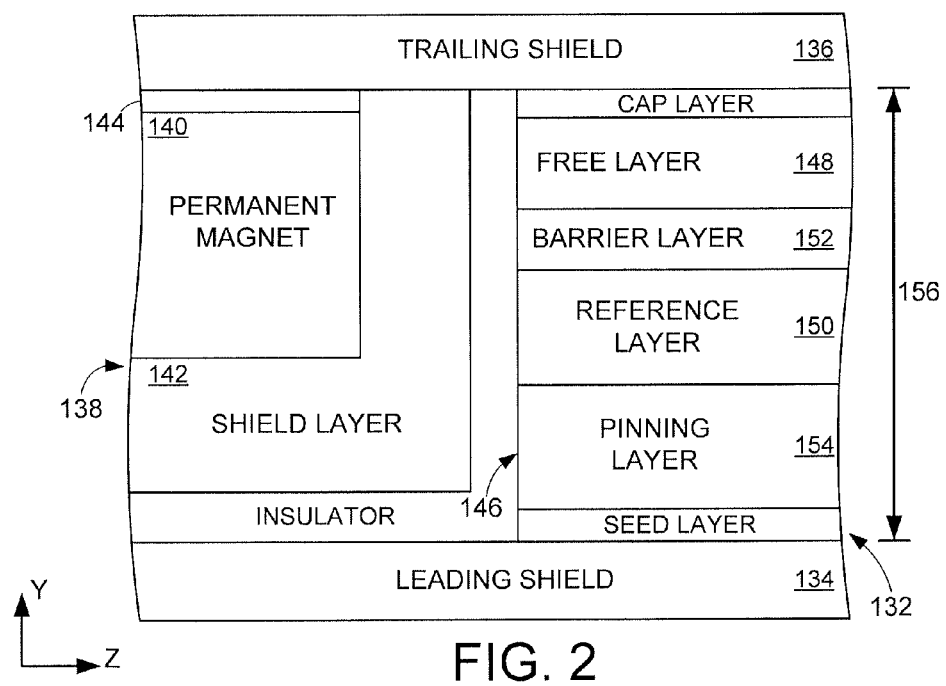
FIG. 2 provides a cross-section block representation of an example magnetic element capable of being used in the data storage device of FIG. 1.

FIG. 2 shows a portion of an example magnetic element 130 employing a magnetoresistive magnetic stack 132 from an air bearing perspective. The magnetic stack 132 is positioned between leading 134 and trailing 136 shields while being separated from a side shield lamination 138. The side shield lamination 138 can concurrently bias portions of the magnetic stack 132 and shield magnetic flux from errant data tracks, such as data tracks 110 of FIG. 1. While the side shield lamination 138 may be an unlimited number of layers, materials, magnetizations, and shapes, various embodiments configure a permanent magnet 140, such as a high magnetic coercivity layer or lamination, to be surrounded on orthogonal sides by a lower magnetic coercivity shield layer 142.

The orientation of the shield layer 142 between the permanent magnet 140 and both the leading shield 134 and magnetic stack 132 while being insulated from the trailing shield 136 by a non-magnetic insulator layer 144 allows the magnetization of the permanent magnet 140 to be incorporated wholly in the shield layer 142. Conversely, positioning the permanent magnet 140 to face the magnetic stack 132 or be coupled to either the leading 134 or trailing 136 shields could provide too much bias to the magnetic stack 132 that would be difficult to reduce through magnetic element 130 tuning. Similarly, the removal of the permanent magnet 140 may render the side shield lamination 138 too sensitive to magnetic fields to provide consistent and stable magnetic shielding and/or biasing to the magnetic stack 132.

Thus, configuring the side shield lamination 138 so that the permanent magnet 140 is present, but buffered from facing a sidewall 146 of the magnetic stack 132 provides side shield magnetic stabilization that can reduce magnetic element 130 noise and optimize magnetic response of the magnetically free layer 148 compared to the fixed magnetization reference layer 150 across the barrier layer 152. That is, the reduction of noise can allow the free layer 148 to respond to an external data bit while the reference layer 150 maintains a fixed magnetization due to the exchange coupling with the pinning layer 154, the external data bit can be read as a logic state. While the presence of fixed and free magnetizations, as shown in FIG. 2, can be characterized as an abutted junction magnetic stack, such configuration is not required or limited as other type of magnetic laminations, such as spin valves and trilayers, may be used.

Regardless of the configuration of the magnetic stack 132, the configuration of the side shield lamination 138 with a shield layer 142 stabilized by contacting the permanent magnet 140 provides tuned operation capable of quickly and reliably reading data bits packed into an increased areal density. However, the construction of the side shield lamination 138 can pose difficulties, especially with the tuned formation of the permanent magnet 140. For example, forming a high magnetic coercivity permanent magnet 140 directly atop a soft magnetic coercivity shield layer 142 can result in diffusion of materials between layer 142 and magnet 142 that effectively poisons the magnetic coercivity of the permanent magnet 140 and degrades side shield lamination 138 performance.

Figure 3:
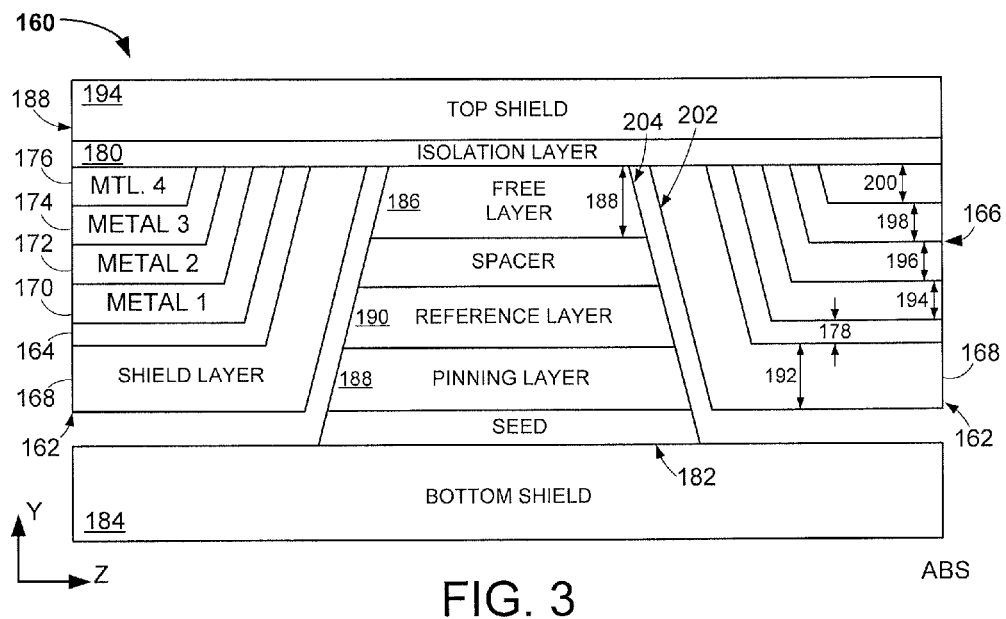
FIG. 3 shows an ABS view block representation of a portion of an example magnetic element constructed in accordance with various embodiments.

The example magnetic element 160 displayed in FIG. 3 illustrates how a side shield lamination 162 can be tuned with a diffusion barrier 164 that decouples the permanent magnet 166 portion of the side shield 162 from the soft magnetic shield layer 168. The diffusion barrier 164 can be configured in accordance with various embodiments to prevent the diffusion of materials between the metal layers 170, 172, 174, and 176 that comprise the permanent magnet 166 and the shield layer 168. As a non-limiting example, the different metal layers 170, 172, 174, and 176 can be configured to interdiffuse into a collective high coercivity magnet through annealing with a predetermined time, temperature, and direction that would allow for the diffusion of shield layer 168 materials into the permanent magnet 166 if the diffusion barrier 164 was not disposed between the magnet 166 and shield layer 168.

With the possible diffusion of materials during annealing operations, the diffusion barrier 164 can be tuned and optimized for thickness 178, material, and orientation to decouple and prevent interdiffusion of materials. In the non-limiting embodiment shown in FIG. 3, the diffusion barrier 164 continuously extends along substantially orthogonal surfaces of the shield layer 168 and permanent magnet 166 with a uniform thickness 178. Such thickness 178 and orientation, along with isolation layer 180, can ensure the permanent magnet 166 forms with predetermined magnetic properties, such as grain growth, anisotropy, and coercivity, after annealing.

The predetermined magnetic properties of the side shield lamination 162 may be chosen in response to the configuration of the magnetic stack 182. That is, the substantially trapezoidal shape of the magnetic stack 182 with a larger width, along the Z axis, at the bottom shield 184 than a free layer 186 at the top shield lamination 188 can correspond with a different permanent magnet 166 coercivity and size than the rectangular shaped magnetic stack 132 of FIG. 2 due to the increased width of the fixed magnetization pinning 188 and reference 190 layers on the air bearing.

The trapezoidal shape of the magnetic stack 182 may further correspond with uniform or varying thicknesses of the respective side shield lamination layers 162. In other words, the shield layer thickness 192, along with the constituent metal layer thicknesses 194, 196, 198, and 200 of the permanent magnet 166, may be collectively or individually uniform throughout or may vary in thickness along the shield sidewall 202 proximal the tapered stack sidewall 204. Such variety of tuning options for the side shield lamination 162 may complement the tuned material and shape of the respective side shield constituent layers to provide stable magnetic shielding without detrimentally affecting the magnetic operation of the free 186 and reference 190 layers of the magnetic stack 182.

In yet, the tuning of some portions of the side shield lamination 162, such as the diffusion barrier 164, may reduce the biasing effect of the permanent magnet 166 and jeopardize the stability and operation of the magnetic element 160. More specifically, the extension of the diffusion barrier 164 continuously about the permanent magnet 166 can eliminate exchange coupling between the magnet 166 and the shield layer 168, which contributes to the biasing strength and direction of the side shield lamination 162.

Figure 4:
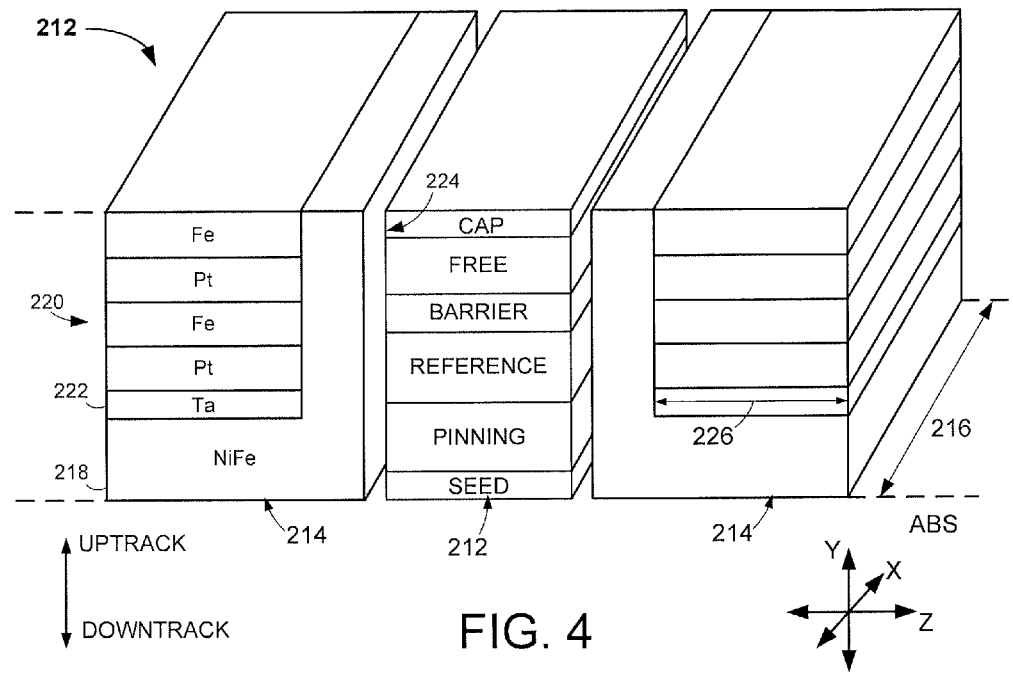
FIG. 4 displays an isometric block representation of a portion of an example magnetic element.

The isometric block representation of example magnetic element 210 of FIG. 4 illustrates how a magnetic stack 212 and side shield lamination 214 can be tuned in accordance with some embodiments to provide stable biasing magnetization while preventing the interdiffusion of materials during construction. As shown, the magnetic stack 212 and side shield laminations 214 are configured with a substantially rectangular shaped sidewalls and interlayer seams that extends continuously along the element's 210 stripe height 216, as measured from the air bearing surface (ABS). Each side shield lamination 214 has a shield layer 218 of NiFe that wraps around downtrack and cross-track portions of the permanent magnet 220 and diffusion barrier 222 to provide magnetic shielding that can direct flux away from the magnetic stack 212 instead of towards the magnetically sensitive portions of the stack 212 proximal the stack sidewall 224.

The permanent magnet 220 can be initially deposited as alternating layers of Iron and Platinum that interdiffuse to form a high coercivity magnet after a predetermined annealing process. In contrast to the shaped permanent magnet layers of FIG. 3, the alternating metal layers of magnet 220 respectively have uniform cross-track shapes and thicknesses that can be the same, or different, to produce the predetermined magnetic coercivity. The diffusion barrier 222 may also be tuned to produce the predetermined magnetic coercivity. For example, the diffusion barrier 222 may be a non-magnet material or compound that exhibits good seed characteristics, such as lattice matching and texture, to be able to initially form the metal permanent magnet layers with predetermined anisotropy and grain growth.

The diffusion barrier 222 can further be tuned to contact some, but not all of the shield layer 218, which can decouple portions of the permanent magnet 220 from the shield layer 218 while allowing exchange coupling to other portions. Such combination of decoupled and coupled portions of the shield layer 218 afforded by shaping the diffusion barrier 222 to not extend uptrack to match the shield layer 218 can allow for precise side shield lamination 214 bias tuning while preventing the interdiffusion of material from the shield layer 218 to the permanent magnet 220 during manufacture.

Figure 5:
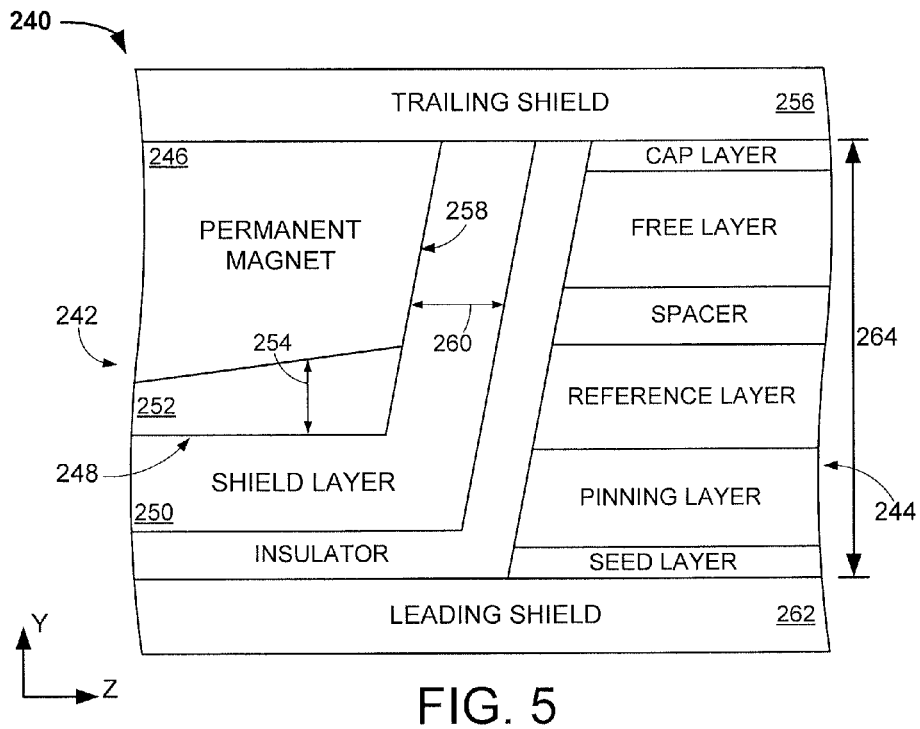
FIG. 5 illustrates an ABS view block representation of a portion of an example magnetic element constructed in accordance with various embodiments.

FIG. 5 displays a portion of an example magnetic data reader 240 constructed with a side shield lamination 242 tuned to provide a predetermined bias magnetization to a magnetic stack 244 with fixed and free magnetizations while preventing the interdiffusion of material within the side shield lamination 242 during manufacturing. The side shield lamination 242 is tuned to have a single layer permanent magnet 246 separated from a first portion 248 of the shield layer 250 by a diffusion barrier 252 that has a varying thickness 254 along the Z axis. The configuration of the diffusion barrier 252 in association with the contacting adjacency of the permanent magnet 246 with the trailing shield 256 can allow side shield bias magnetization to reach the magnetic stack 244 in manners different from the side shield laminations of FIGS. 2-4.

Specifically, the shaped configuration of the diffusion barrier 252 can reduce the contacting size of a second portion 258 of the shield layer 250 to decrease the exchange coupling and resultant bias magnetization imparted on the magnetic stack 244. The configuration of the diffusion barrier 252 may also be used to determine the thickness 260 of the shield layer 250 proximal the magnetic stack 244 to tune the lateral shielding of the side shield lamination 242. In other words, the shape and material of the diffusion barrier 252 can be tuned in relation to the shield layer 250 to provide predetermined amounts of magnetic shielding in concert with the trailing 256 and leading 262 shields to define a magnetic extent 264 that allows access to individual data bits of an increased areal density data storage environment.

Figure 6:
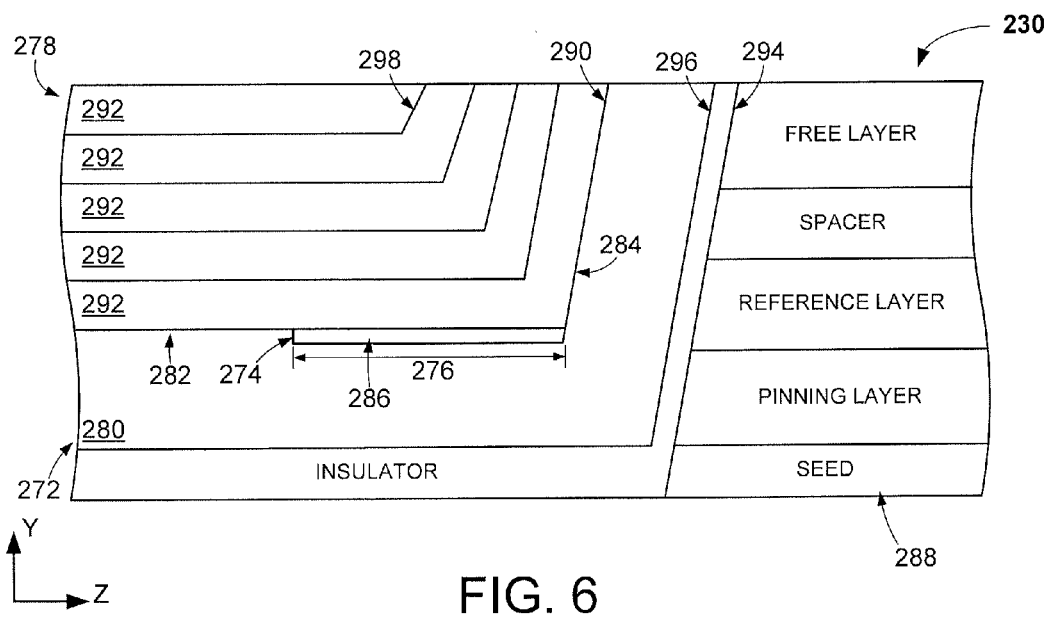
FIG. 6 graphs operational data for various example magnetic elements.
Figure 7:
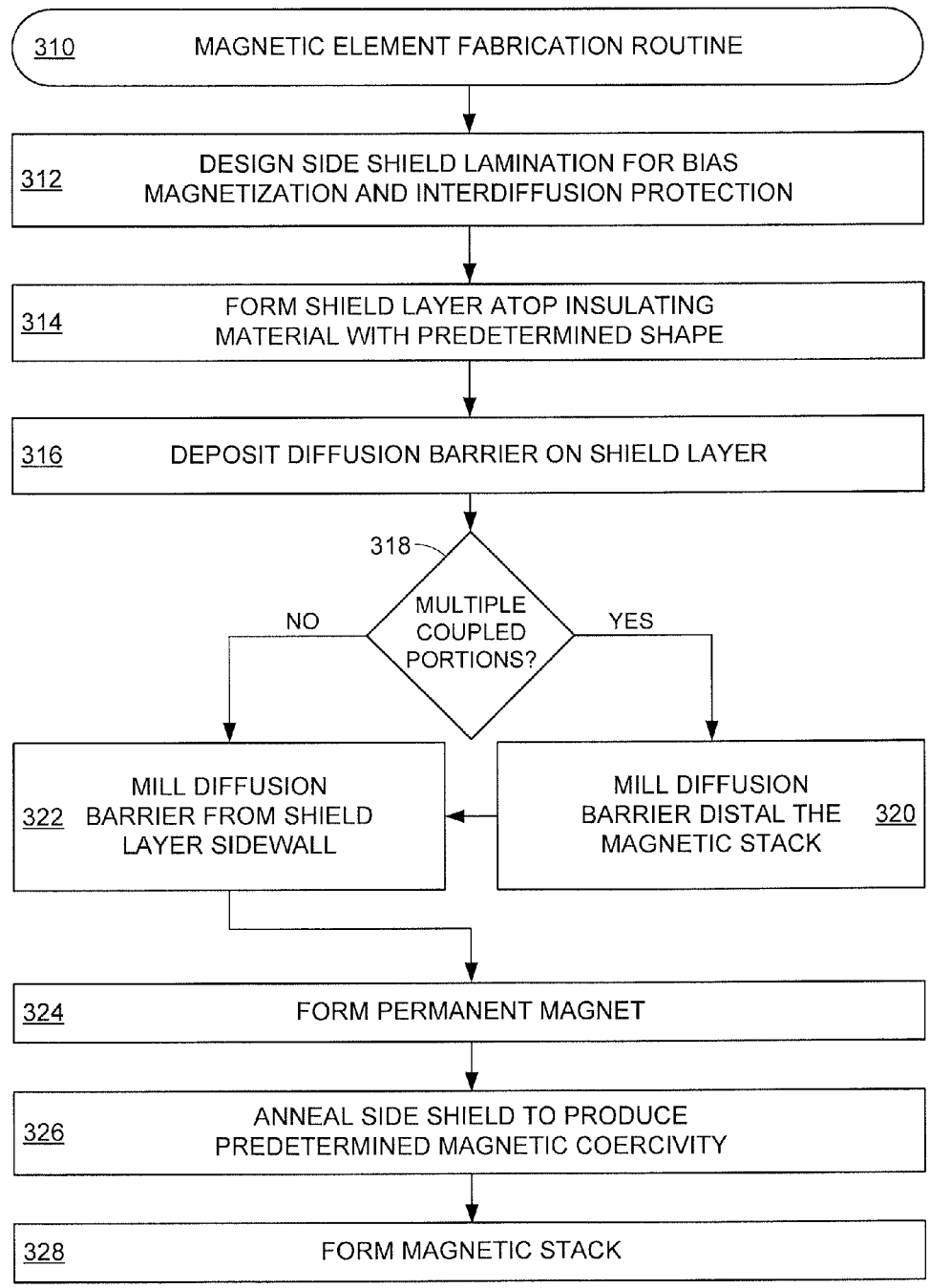
FIG. 7 provides a flowchart illustrating steps of an exemplary magnetic element fabrication routine conducted in accordance with various embodiments.

The diversity of tuning options for the diffusion barrier 252 is further elaborated by the tuned configuration of magnetic element 270 shown in FIG. 6. In accordance with various embodiments, the side shield lamination 272 has a diffusion barrier 274 constructed with a width 276 that is less than the width of either the permanent magnet 278 or the shield layer 280. Such diffusion barrier 274 design can provide first 282 and second 284 coupled portions and a decoupled portion 286 between the permanent magnet 278 and the shield layer 280 that can optimize side shield lamination 272 magnetic shielding while providing predetermined magnetic bias. That is, the size and position of the diffusion barrier 274 can be tuned to prevent interdiffusion of materials along the decoupled portion 286 while allowing the coupling portions 282 and 284 to provide bias magnetization to the shield layer 280.

The direct contact of the permanent magnet 278 with the shield layer 280 at the second coupled portion can be tuned to produce a magnetic coercivity gradient along the Z axis, such as high coercivity distal to the magnetic stack 288 and low coercivity at the permanent magnet sidewall 290. The permanent magnet 278 may further be tuned with varying metal sidewall angles to provide different metal layer 292 thicknesses proximal the permanent magnet sidewall 290. As shown, sidewall 290 has a taper angle that substantially matches the magnetic stack sidewall 294 and the shield layer sidewall 296 while the metal layers 292 have reduced angled sidewalls 298, which can allow the metal layers 292 to have common thicknesses along the first coupled 282 and decoupled 286 portions, but varying thicknesses along the second coupled portion 284.

The size and position of the diffusion barrier 274 may further be selected to tune the first coupled portion 282 so that bias strength is localized distal the magnetic stack 288 to increased magnetic stabilization of the side shield lamination 272 bias magnetization and optimize magnetic shielding. Regardless of how the diffusion barrier 274 is configured, the reduction or elimination of material interdiffusion between the permanent magnet 278 and the shield layer 280 can increase the magnetic coercivity potential of the metal layers 292 after annealing while the presence of coupled portions 282 and 284 allows a predetermined amount of bias magnetization to stabilize magnetic shielding in the presence of magnetic flux.

With the various side shield configurations displayed in FIGS. 2-6, the flexible configurations possible by positioning a diffusion barrier between a permanent magnet and soft magnetic shield layer become evident. While the construction of a magnetic element employing a tuned side shield lamination is not restricted to a particular process or procedure, some embodiments form a magnetic element in accordance with the example magnetic element fabrication routine 310 conveyed in FIG. 6.

Step 312 starts routine 310 by designing the side shield lamination at least for the amount of bias magnetization and interdiffusion protection to be afforded by a diffusion barrier. As displayed in FIGS. 2-6, step 312 can evaluate and tune the various layers of the side shield lamination to provide an optimized balance between interdiffusion protection and bias magnetization corresponding to exchange coupling. Step 312 may further consider and design at least one layer of the side shield lamination with a substantially "L" shape, as shown in FIGS. 2-6, where the layer continuously extends along two orthogonal directions.

A determination of the design of the side shield lamination from step 312 advances routine 310 to step 314 where a shield layer is formed with a predetermined shape atop insulating material like a silicon substrate or alumina insolation layer. The formation of the shield layer in step 314 can comprises one or more sub-steps, such as deposition, etching, and polishing, which shape the shield layer to the shape predetermined from step 312. In some embodiments, the shield layer is formed of a NiFe or alloy that provides soft magnetic properties conducive to magnetic shielding. In contrast, the diffusion barrier deposited in step 316 is formed of a non-magnetic material like Ta, Ru, and alumina that exhibits good seed characteristics such as phase transformation and anisotropy.

While not required or limited, step 316 may be conducted in combination with milling and etching operations that remove predetermined areas of the diffusion barrier material to allow the subsequently deposited permanent magnet to contact certain coupled portions, as generally illustrated in FIGS. 5-6. Decision 318 determines if multiple coupled portions are to be constructed by removing diffusion barrier material from the underlying shield layer. A determination that multiple coupled portions are to be fabricated, step 320 mills predetermined portions of the diffusion barrier distal to the to-be deposited magnetic stack. At the conclusion of forming the coupled portion distal the magnetic stack or with a determination that a single coupled portion is to be included in the magnetic element, step 322 removes diffusion barrier material from the shield layer sidewall.

It should be noted that step 322 may involve the removal of portions of the diffusion barrier at a predetermined decoupled portion to provide a varying thickness diffusion barrier. Regardless of the position and size of the coupled portions created in steps 320 and 322, completion of the diffusion barrier is immediately followed by step 324 where the permanent magnet is formed. The permanent magnet may be a single layer or lamination of layers comprising single elements, like Fe and Pt, or compounds. The permanent magnet can initially be alternating layers designed to interdiffuse into a single compound during the annealing of step 326. Such annealing can be conducted with a predetermined temperature for a predetermined amount of time and in an unlimited variety of directions to tune the magnetic coercivity of the permanent magnet.

With the diffusion barrier preventing at least some interdiffusion of materials between the shield layer and the permanent magnetic during step 326, the coercivity of the permanent magnet can be increased and the coupled portions of the shield layer can be optimized to provide stable bias magnetization and magnetic shielding. After the side shield lamination is formed, step 328 concludes routine 310 by forming a magnetic stack with a predetermined configuration, such as an abutted junction or spin valve lamination, adjacent to and separated from the side shield lamination.

While the formation of a single side shield lamination is provided through routine 310, it should be understood that multiple side shield lamination can be concurrently or successively built with similar or dissimilar configurations. It should also be understood that the various steps and decisions of routine 310 are not limiting and can be edited, moved, and omitted, at will. For instance, step 328 may form a magnetic stack prior to the formation of the shield layer in step 314.

Through routine 310, the various embodiments of FIGS. 3-6 may be constructed with tuned magnetic characteristics, such as magnetic coercivity, which can provide an optimized balance of magnetic shielding with interdiffusion protection. The ability to tune the shape, material, thickness, stability, and bias of the diffusion barrier allows the side shield lamination to be catered to a wide variety of data storage environments. Moreover, the stabilized side shield magnetization provided by the coupled portions of the shield layer corresponds with an increasingly stable side shield without adding to the shield-to-shield spacing of the magnetic element, which is conducive to operation in larger capacity data storage devices with higher data access accuracy and faster data transfer times.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a side shield positioned adjacent to and separated from a stack sidewall of a magnetic stack, the side shield comprising a shield layer disposed between the stack sidewall and a permanent magnet, the permanent magnet separated from a first portion of the shield layer by a diffusion barrier that decouples the permanent magnet from the shield layer, the permanent magnet comprising alternating metal layers that interdiffuse to a single compound in response to annealing.

2. The apparatus of claim 1, wherein the magnetic stack is configured as an abutted junction read sensor comprising a magnetically free layer and a fixed magnetization reference structure.

3. The apparatus of claim 1, wherein the magnetic stack is configured as a spin valve read sensor.

4. The apparatus of claim 1, wherein the diffusion barrier comprises a non-magnetic material.

5. The apparatus of claim 1, wherein the alternating metal layers are respectively Fe and Pt.

6. The apparatus of claim 1, wherein the permanent magnet is decoupled from a trailing shield by a first isolation layer and the shield layer is decoupled from a leading shield and the magnetic stack by a continuous second isolation layer.

7. The apparatus of claim 6, wherein the diffusion layer contacts the first isolation layer and is separated from the second isolation layer by the shield layer.

8. The apparatus of claim 1, wherein the shield layer is shaped to continuously extend along two orthogonal directions to form an "L" shape.

9. The apparatus of claim 1, wherein the permanent magnet has a higher magnetic coercivity than the shield layer.

10. The apparatus of claim 1, wherein the shield layer has a shield sidewall shaped to match the stack sidewall.

11. An magnetic element comprising:
a magnetic stack; and
a side shield positioned adjacent to and separated from a stack sidewall of the magnetic stack, the side shield comprising a shield layer continuously extending along orthogonal sides of a permanent magnet, the permanent magnet separated from a first portion of the shield layer by a diffusion barrier and contacting a second portion of the shield layer, proximal the stack sidewall, the shield layer having a uniform thickness along each orthogonal side of the permanent magnet.

12. The magnetic element of claim 11, wherein the diffusion barrier has a first width on an air bearing surface that is less than a second width of the shield layer.

13. The magnetic element of claim 11, wherein the diffusion barrier has a uniform thickness along a cross-track direction.

14. The magnetic element of claim 11, wherein the diffusion barrier has a varying thickness along a cross-track direction.

15. The magnetic element of claim 11, wherein the permanent magnet and shield layer are exchange coupled along the second portion.

16. The magnetic element of claim 11, wherein the shield layer contacts the permanent magnet at a third portion, distal the magnetic stack.

17. The magnetic element of claim 11, wherein the diffusion barrier defines a decoupled portion between the permanent magnet and shield layer.

18. A method comprising:
constructing a side shield adjacent to and separated from a stack sidewall of a magnetic stack; and
separating a permanent magnet of the side shield from a shield layer of the side shield with a diffusion barrier that decouples the permanent magnet from the shield layer, the shield layer disposed between the stack sidewall and the permanent magnet and continuously extending along orthogonal sides of the permanent magnet, the diffusion barrier having a uniform thickness that separates the permanent magnet from the shield layer by a common separation distance along each orthogonal side of the permanent magnet.

19. The method of claim 18, further comprising annealing the side shield to provide a predetermined first coercivity in the permanent magnet that is greater than a predetermined second coercivity of the shield layer.

20. The method of claim 19, wherein the diffusion barrier prevents interdiffusion of shield layer material with permanent magnetic material during the annealing step.

* * * * *